B. C. OBLINGER.
VEHICLE WHEEL.
APPLICATION FILED APR. 3, 1908.

931,214.

Patented Aug. 17, 1909.

Witnesses

Inventor
Barrett C. Oblinger.
By C. A. Snow & Co.
Attorneys

UNITED STATES PATENT OFFICE.

BARRETT C. OBLINGER, OF INDEPENDENCE, MISSOURI, ASSIGNOR OF ONE-HALF TO ALBERT H. C. BEATTY, OF INDEPENDENCE, MISSOURI.

VEHICLE-WHEEL.

No. 931,214.    Specification of Letters Patent.    Patented Aug. 17, 1909.

Application filed April 3, 1908. Serial No. 424,936.

*To all whom it may concern:*

Be it known that I, BARRETT C. OBLINGER, a citizen of the United States, residing at Independence, in the county of Jackson and State of Missouri, have invented a new and useful Vehicle-Wheel, of which the following is a specification.

This invention relates to vehicle wheels of that character utilizing spring controlled spokes in lieu of pneumatic tires, thus permitting the use of a solid tire but obtaining all of the resiliency resulting from the use of a pneumatic tire.

The object of the invention is to provide a novel arrangement of spokes and springs whereby the rim of the wheel will be capable of independent movement relative to the hub, said rim, however, being held against undesirable rotation with respect to the hub.

Another object is to provide a wheel all of the parts of which can be conveniently reached for the purpose of repairing or replacing the same.

Another object is to provide a wheel which is not only durable and simple in construction but can be manufactured at comparatively slight cost and will not easily get out of order.

With these and other objects in view the invention consists of certain novel features of construction and combinations of parts which will be hereinafter more fully described and pointed out in the claims.

In the accompanying drawings is shown the preferred form of the invention.

Figure 1:
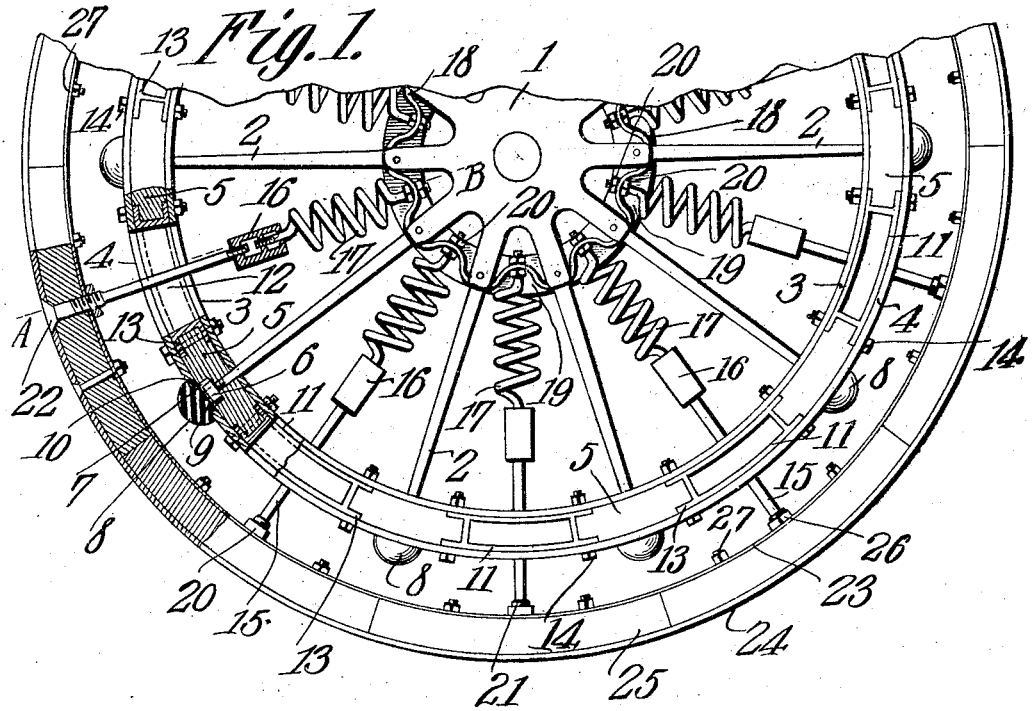
Figure 2:
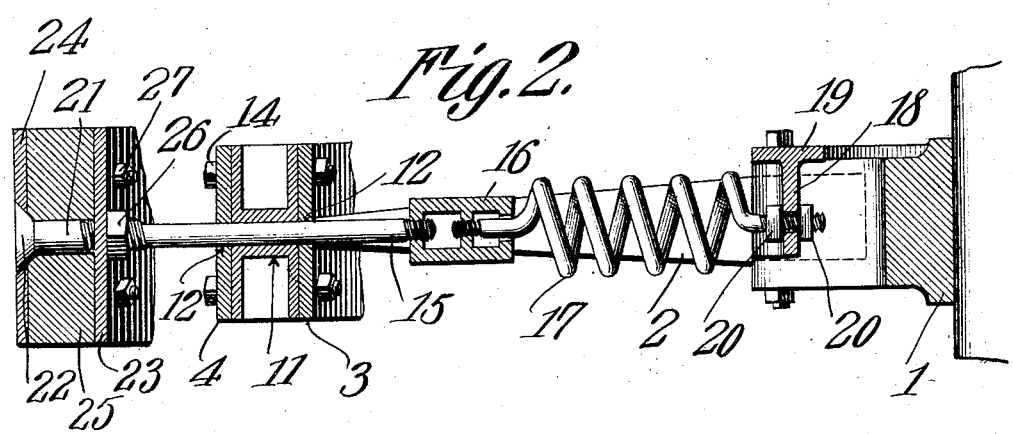

In said drawings: Figure 1 is a view partly in side elevation and partly in section of a portion of the wheel. Fig. 2 is an enlarged section on line A—B, Fig. 1.

Referring to the figures by characters of reference, 1 designates a hub of any desired construction and having radial spokes 2 of wood or metal to the outer ends of which is secured an inner rim consisting of concentric circular hoops or rings 3 and 4, said rings being formed of metal and spaced apart by means of filling blocks 5 preferably made of wood and which are located at the ends of the spokes. These spokes project through inner ring 3 and have nuts 6 upon their outer ends which are seated in recesses 7 in the blocks 5. Cushioning devices such as rubber buttons 8 are preferably secured to the outer ring 4 and across the recesses 7, these buttons being fastened in position in any preferred manner as by providing them with enlargements 9 seated in openings 10 within ring 4. Located between the filling blocks 5 are metal boxes 11 arranged in pairs and oppositely disposed, said boxes being preferably formed of brass and spaced apart so as to form longitudinal slots which register with similar slots 12 formed in the rings 3 and 4. Flanges 13 preferably extend from the ends of the boxes and straddle the ends of the filling blocks and any suitable means such as bolts 14 extend through the rings, flanges, and blocks for the purpose of securely fastening parts in place.

Extending through each pair of slots 12 and between the boxes adjacent thereto is a movable spoke 15 having a coupling sleeve 16 screwed upon its inner end and engaging the threaded end of a heavy coiled spring 17. The other end of this spring is screw threaded and engages a bowed flange 18 which extends laterally from a ring 19 bolted or otherwise secured to one side of the spokes 2 and close to hub 1. These flanges are designed to fit snugly between the spokes, as clearly indicated in Fig. 1, and lock nuts 20 may be placed upon the threaded portion of each spring and at opposite sides of the flange engaged thereby for the purpose of securing the spring in adjusted position. The outer end portion of each spoke 15 is enlarged as indicated at 21 and screw threaded, said end terminating in a head 22. These enlarged portions are designed to be inserted through the outer rim of the wheel, which rim consists of inner and outer rings 23 and 24 spaced apart by arcuate filling blocks 25. The heads 22 are located in countersinks within the outer ring 24 and the enlarged portions 21 of the spokes extend through the inner ring, there being a lock nut 26 upon the threaded portion of said enlargement for securely fastening the spoke within the outer ring. Any suitable means such as bolts 27 may be provided for additionally securing the filling blocks between the rings 23 and 24.

It is of course to be understood that the inner and outer rims of the wheel are normally concentric and the inner rim is always concentric with the hub. When the wheel is in use the inner rim will be free to move relatively to the outer rim so as to take up jolts and thus permit a vehicle to pass smoothly over rough roads. This movement of the outer rim relative to the inner rim is permitted because of the spring connections between the spokes of the outer rim and the hub. Independent lateral movement of the rims is prevented because the spokes of the outer rim work within the slots 12 of the inner rim. These slots, however, permit a slight independent movement of the outer rim in the direction of its circumference but this, however, is desirable because it facilitates the starting of a vehicle upon which the wheels are employed. If for any reason the stress of the springs should be overcome, as by a sudden severe jolt of the wheel, the inner rim will be prevented from coming into contact with the outer rim by the rubber cushions or buttons 8. Inasmuch as the ring 19 is fastened to the inner sides of the spokes access can be readily had to the springs and their points of connection from the outside of the wheel and repairs will therefore be greatly facilitated.

A wheel such as herein described can be manufactured much cheaper than a wheel for similar purposes and provided with a pneumatic tire and, moreover, is much more durable because the outer rim, being made of wood and metal, can better withstand all wear and tear than can a wheel utilizing a pneumatic tire.

What is claimed is:

1. In a wheel the combination with a hub, and spokes radiating therefrom; of a rim secured to said spokes and comprising outer and inner slotted rings, filling blocks interposed therebetween, and slotted bearing boxes interposed between the rings and filling boxes.

2. The combination with a hub, spokes radiating therefrom, and a slotted rim secured to the spokes; of an outer rim comprising inner and outer rings, filling blocks secured therebetween, spokes fixedly connected to said rim and movably mounted within the slots, a ring secured to the spokes of the slotted rim, projecting devices thereon extending between said spokes, and elastic connections between said devices and the spokes of the outer rim.

3. A wheel comprising a hub, spokes fixedly connected thereto and radiating therefrom, a ring secured upon one face of the spokes, a series of inwardly bowed flanges extending laterally from the ring and seated between the spokes, an inner rim carried by the spokes and concentric with the hub, said inner rim having circumferential slots, an outer rim, spokes carried by the outer rim and extending through the slots, and spring connections between the spokes of the outer rim and the bowed flanges.

4. A wheel comprising a hub, spokes fixedly connected thereto and radiating therefrom, a ring secured to the spokes at one side of the wheel, a series of inwardly bowed flanges extending laterally from the ring and between the spokes, an inner rim fixedly connected to said spokes and having circumferential slots, an outer rim, inwardly extending spokes carried by the outer rim and extending through the slots, and springs adjustably connected to the spokes of the outer rim and to the bowed flanges.

In testimony that I claim the foregoing as my own, I have hereto affixed my signature in the presence of two witnesses.

BARRETT C. OBLINGER.

Witnesses:
E. R. HUMPHREY,
E. L. MAJOR.